US012529360B2

(12) United States Patent
Pardo

(10) Patent No.: US 12,529,360 B2
(45) Date of Patent: Jan. 20, 2026

(54) DIRECT-DRIVE WIND TURBINE

(71) Applicant: OPTIMIZED GENERATORS, SL, Barcelona (ES)

(72) Inventor: Santiago Canedo Pardo, Barcelona (ES)

( * ) Notice: Subject to any disclaimer, the term of this patent is extended or adjusted under 35 U.S.C. 154(b) by 72 days.

(21) Appl. No.: 18/563,159

(22) PCT Filed: Jul. 14, 2022

(86) PCT No.: PCT/ES2022/070459
§ 371 (c)(1),
(2) Date: Nov. 21, 2023

(87) PCT Pub. No.: WO2023/285725
PCT Pub. Date: Jan. 19, 2023

(65) Prior Publication Data
US 2024/0151212 A1    May 9, 2024

(30) Foreign Application Priority Data
Jul. 14, 2021   (ES) .................................. 202130666

(51) Int. Cl.
| F03D 80/80 | (2016.01) |
| F03D 9/25 | (2016.01) |
| F03D 15/20 | (2016.01) |
| F03D 80/70 | (2016.01) |

(52) U.S. Cl.
CPC ............... F03D 80/88 (2016.05); F03D 9/25 (2016.05); F03D 15/20 (2016.05); F03D 80/70 (2016.05); *F05B 2240/21* (2013.01); *F05B 2240/54* (2013.01)

(58) Field of Classification Search
CPC . F03D 80/88; F03D 80/70; F03D 9/25; F03D 15/20; F05B 2240/54
See application file for complete search history.

(56) References Cited

U.S. PATENT DOCUMENTS

| 2009/0243301 A1* | 10/2009 | Longtin ............... H02K 7/1838 290/55 |
| 2014/0084590 A1* | 3/2014 | Rhinefrank ............. H02K 1/28 310/91 |
| 2014/0361547 A1* | 12/2014 | Alti Barbon ............. F03D 9/25 290/55 |
| 2015/0030277 A1* | 1/2015 | Pick ........................ F16C 19/38 384/558 |
| 2019/0002204 A1* | 1/2019 | Reinthaler ............... H02K 1/14 |

* cited by examiner

*Primary Examiner* — Sean Gugger
(74) *Attorney, Agent, or Firm* — Eugenio J. Torres-Oyola; Victor M. Rodriguez-Reyes; Rafael Rodriguez-Muriel

(57) ABSTRACT

A direct drive wind turbine comprising a frame (20) mounted on the nacelle (2), a hub (10) with blades (11) rotating about a pivot axis (80), first guiding means (31) and second guiding means (32), one fixed to the frame (20) and the other to the hub (10), first guiding means (31) and second guiding means (32), one fixed to the frame (20) and the other to the hub (10), and coaxial with the axis of rotation (80), and complementary for a guided rotation around the axis of rotation (80) of the hub (10) with respect to the frame (20), first electric current generating means (51), fixed to the frame (20) configuring a stator; and second electric current generating means (52), fixed to the hub (10) forming a rotor, and elastic fixing means (60), pre-compressed, which produce a thrust of the first guiding means (31) and the second guiding means (32) against each other in the radial direction.

19 Claims, 15 Drawing Sheets

DIRECT-DRIVE WIND TURBINE

FIELD OF THE INVENTION

The invention relates to a direct-drive wind turbine (AAD) consisting of a tower with a nacelle at the top, a hub with blades rotating around a rotation axis (defining an axial direction, a radial direction which is perpendicular to the axial direction and a circumferential direction which is tangential to the rotation of said rotation axis), wherein each of said blades defines a longitudinal axis, and a frame mounted on the nacelle.

State of the Art

Modern wind turbines are commonly used to feed electricity into the power grid. Direct-drive wind turbines i.e., those that have no gearing mechanism (no multiplier) located between the rotation axis of the blades and the rotation axis of the electric rotor, so that both rotation axis rotate at the same angular speed, generally comprise a hub and a plurality of blades. The hub rotates by the action of the wind on the blades. The generating torque is transmitted directly to a plurality of electric poles which rotate at the same angular speed as the hub.

In direct-drive wind turbines, the stator of the electric generator is firmly connected to the frame. The rotor of the electric generator, which is in turn solidly attached to the hub, rotates around the center of the generator stator thanks to one or two bearings arranged between the hub and the frame. An orientation system allows the frame to rotate with respect to the tower to keep the rotor oriented to the wind.

In direct-drive wind turbines, it is desirable to reduce and maintain a stable air gap between the stator and the rotor. Increasing the air gap forces to increase in turn the induction generated by the electrical coils, which has a very negative impact in terms of higher manufacturing costs, lower yields and increased system weight. The variation of the air gap in turn has consequences on the quality of the energy produced and generates unwanted magnetic forces.

In large direct-drive wind turbines the air gap distance is far away from the center of rotation of the generator. This increases the sliding speed between the stator and the rotor and thus maximizes the efficiency of the electric field generated by the electrical coils. In contrast, the bearings that support the stresses of the hub and generator are usually much smaller in diameter for manufacturing and operational reasons.

In certain wind conditions, the blades transmit high stresses to the hub that must be supported by the bearings. Such stresses inevitably cause deformations that result in rotor shifts and thus in variations of the air gap. In order to minimize and keep the air gap stable under all expected operating conditions it is necessary to severely increase the stiffness of both rotor and stator structures and to provide the system with a robust bearing configuration that minimizes relative movements, both resulting in higher costs and increasing the weight of the system.

Document EP 2 157 314 B2 shows a conventional arrangement of the elements of a direct-drive generator. One or two bearings are proposed, and the generator air gap is arranged in the midplane of the bearing in order to minimize air gap fluctuations. However, it does not completely solve the problem and requires large structures relating the bearings and the generator.

WO 2012/138725 proposes a mechanical assembly for maintaining the air gap between the stator and rotor in an electric rotating machine by using a plurality of sectors that are flexibly coupled to the hub. However, such systems can be costly and heavy.

Document US 2011/0193349 provides a bearing configuration around a very large generator whose rotor integrates the blades. However, this solution poses major technological and constructive challenges that are difficult to solve.

Document EP 3 001 540 has a configuration of bearings linking the hub and the central frame and connected carriages running on rails located on the stator and driven by the hub. However, it is a complex and costly system.

U.S. Pat. No. 8,786,124 B2 uses a separate bearing for the generator and a resilient element between the generator hub and rotor. It is also an expensive and heavy system.

WO 2004/068678 describes a rotating electrical machine, in which the rotor is rotationally articulated to the stator by means of bearing devices arranged in or adjacent to an air gap between the rotor and the stator.

EP 1 394 406 describes a wind energy system having a wind rotor directly connected to a rotor ring of a generator carrying a magnet. The blades of the wind rotor are arranged on the rotor ring and/or on an axial extension of the rotor ring. The wind rotor can rotate on several bearings spaced a certain axial distance apart or a single bearing, preferably at the transition to the rotor ring extension.

Document EP1657437 discloses a direct-drive electric generator designed for wind turbine having an independent bearing for the generator formed by a plurality of bogies with electrical coils and with wheels on which permanent magnets housed on the rotor circulate. EP1657437 proposes to integrate a generator, provided with rotor bearings adjacent to the air gap, in a wind power plant so that the forces of the wind turbine are absorbed by dedicated turbine bearings and is characterized in that the wind turbine is arranged in the frame by means of a turbine bearing arrangement, separate from the generator bearing arrangement.

The design proposed in EP1657437 implies that the forces and momentum of the wind turbine, except for the motor torque, are absorbed by the turbine bearing. The torque is transmitted from the wind turbine to the generator rotor by a series of elastic elements. The elasticity of the elements can come from the use of rubber or other elastomeric material. The reason for the need for the resilient property is that it is a means of preventing unwanted forces from deformation of the wind turbine and generator from entering the turbine bearing arrangement of the generator.

The document WO2011065893 describes a rotating electrical machine with improved rotor bearing and similar to the invention disclosed in EP1657437 referred to above has bogies in this case connected to each other, and radially prestressed by means of elastomers that allow absorbing the deformations of the rotor and the manufacturing tolerances guaranteeing the stability of the distance of the air gap.

The electric machine of WO2011065893 comprises: a stator with an opening, an essentially circular rotor mounted in the stator opening, wherein the rotor is coupled to the stator by means of wheels and characterized in that the rotor comprises at least four rotor sections, each rotor section integrating at least one pair of wheels, wherein the adjacent rotor sections are pivotally interconnected in the peripheral direction of the rotor.

The present invention proposes an alternative structure, to that described in the previously detailed documents, for a direct drive wind turbine and aims at overcoming the drawbacks presented in the previous technical solutions. This purpose is achieved by means of a wind turbine as described in claim 1.

DISCLOSURE OF THE INVENTION

The proposed wind turbine as described in claim 1, comprises in a manner in itself known:
- a tower with a nacelle at its upper end, and with a frame mounted on said nacelle,
- a hub with blades rotating about a pivot axis, said pivot axis defining an axial direction, a radial direction which is perpendicular to said axial direction and a circumferential direction which is tangential to a circle concentric to said pivot axis, wherein each of said blades defines a longitudinal axis,
- first guiding means and second guiding means, fixed one to the frame and the other to the hub, the first guiding means and the second guiding means being concentric, coaxial with the axis of rotation, and complementary for a guided rotation around the axis of rotation of the hub with respect to the frame;
- an electrical generator, suitable for generating electrical energy from the rotation of the hub relative to the frame, comprising:
  - a plurality of first means for generating electrical current by electromagnetic induction, fixed to the frame and arranged circularly around the rotation axis thus configuring a stator, and
  - a plurality of second electric current generating means by electromagnetic induction, fixed to the hub and arranged circularly around the axis of rotation, constituting a rotor which rotates jointly with said hub around the axis of rotation.

The first guiding means may be attached to the frame, in which case the second guiding means will be attached to the hub, or the first guiding means will be attached to the hub, in which case the second guiding means will be attached to the frame. In either case, the first and second guiding means provide circular guidance between the hub and the frame, allowing it to rotate.

The present invention further proposes, in a manner not known in the state of the art, that the wind turbine further includes pre-compressed elastic fixing means which produce a thrust of the first guiding means and the second guiding means against each other in the radial direction, elastically modifying the distance in the radial direction between the first generating means and the frame and/or between the second generating means and the hub.

These pre-compressed elastic fixing means ensure precise guidance of the hub with respect to the frame, and maximum proximity, in the radial direction, between the first generating means and the second generating means.

The elastic fixing means exert a force which tends to compress, in a radial direction, the first guiding means and the second guiding means against each other.

In the wind turbine according to the invention the air gap distance (i.e. the distance between the first generating means and the second generating means) is determined by the distance between the first guiding means and the second guiding means which, in turn, are compressed against each other by the elastic fixing means. In this way, a high degree of precision in the air gap can be achieved without having to manufacture large parts with very small tolerances and, in addition, this gap remains very constant during the operation of the wind turbine, despite the deformations that the various elements of the wind turbine may undergo when subjected to the working loads.

The elastic fastening means absorb and compensate both the manufacturing tolerances (which thus need not be so tight) and the deformations of the structures caused by the working loads (which thus need not be so robust).

The first and second means of guidance can also function as conventional bearings and can therefore complement or even replace them.

Preferably the means generating electric current by magnetic induction are coils, on the one hand, and permanent magnets, on the other hand. Thus, there are two possible advantageous alternatives of a wind turbine according to the invention.

According to one embodiment, the first generator means are electrical coils, and the second generator means are magnets. In this case, the coils are the fixed component of the generator, and the magnets are the moving component.

According to another alternative embodiment, the first generating means are magnets, and the second generating means are coils. In this case the magnets are the fixed generator component, and the coils are the moving component. The present invention is compatible with either of these two alternatives.

Advantageously the elastic fixing means are circumferentially separated from each other, that is to say distributed at different angular positions along a circumference concentric with the axis of rotation, forming a plurality of elastic fixing units (preferably there are a minimum of 3 elastic fixing units, although in practice there will preferably be many more).

Each of the elastic fixing units produces a thrust, in the radial direction, independent of the thrust produced by the other elastic fixing units, each elastic fixing unit being therefore capable of moving elastically, in the radial direction, independently of the displacement of the other elastic fixing units. In this way each of the elastic fixing units can move according to "its needs" without its radial position being affected by the possible radial displacements of the other elastic fixing units. Repair and maintenance work is also facilitated, since only the elastic fixing unit that requires it can be dismantled and repaired.

Each elastic fixing unit produces a thrust in one main working direction and has a geometric center. The main working direction forms, according to one embodiment, a non-zero angle with a plane formed by a radial direction passing through the geometric center and the axial direction.

It is also advantageous that, alternatively or additionally, the main working axis forms a non-zero angle with a plane formed by a radial direction passing through said geometrical center and its corresponding tangential direction.

A possible alternative is also contemplated, consisting of positioning the elastic fixing units so that their main working direction extends in the radial direction passing through the geometric center. In this case the elastic fixing units will work optimally in their main function, which is to exert a thrust that tends to compress (precisely in the radial direction) the first guiding means and the second guiding means with respect to each other. However, the elastic fixing units will also be subjected to stresses that are not radial but will have components in the tangential and/or axial directions. It may therefore be advantageous to incline the elastic fixing units in such a way that they can better absorb these non-radial stresses.

Preferably, one of the first and second guiding means are rails arranged circumferentially around the axis of rotation and the other of the first and second guiding means are a plurality of wheels rolling on the rails, or a plurality of skids sliding on the rails. In this case, and when the elastic fixing means are circumferentially spaced apart from each other forming a plurality of elastic fixing units and each of which comprises at least one of the elastic fixing units, so that each of the elastic fixing units is suitable to move elastically radially independently the other elastic fixing units, it is advantageous that the elastic fixing units are carriages comprising the wheels and bearing mounted first generating means or second generating means. This last advantageous alternative can be realized in two ways:

the first guiding means are the rails, and the second guiding means are the carriages where, preferably, the first generating means are coils arranged between the rails and the second generating means are magnets mounted on the carriages; that is, the rails are fixed, and the carriages rotate about the axis of rotation.

the first guiding means are the carriages, and the second guiding means are the rails where, preferably, the first generating means are coils mounted on the carriages and the second generating means are magnets arranged between the rails; that is, the carriages are fixed, and it is the rails that rotate around the axis of rotation.

Preferably each carriage has at least four wheels.

Preferably the carriages have dynamic seals. These dynamic joints extend between the carriages and the rails and are intended to prevent any particles or foreign bodies from entering the air gap.

As regards the wheels, the present invention contemplates various advantageous alternatives (in general, it should be borne in mind that each of the wheels defines a rolling axle):

the rolling axles form a non-zero angle with the axial direction. Preferably the rolling axles form an angle between 31° and 45° to the axial direction. In this way the wheels can better withstand axial stresses.

in a first group of the plurality of wheels the rolling axles are parallel to the axial direction and in a second group of the plurality of wheels the rolling axles are perpendicular to the axial direction.

in a first group of the plurality of wheels the rolling axles are parallel to the axial direction and in a second group of the plurality of wheels the rolling axles are perpendicular to the axial direction, wherein the second group of wheels is fixed to the frame. That is, in this alternative not all the wheels are mounted on the carriages, but the second group of wheels is mounted on the frame. In fact, it is advantageous that the second group of wheels is fixed to the frame in the case where the rails are the second guiding means (i.e. those which rotate around the axis of rotation) while it is advantageous that the second group of wheels is fixed to the rotor in the case where the rails are the first guiding means (i.e. those which are fixed to the frame and are therefore static). In general, this second group of wheels no longer participates in the maintenance of the air gap, so they can be detached from the elastic means of attachment and, instead, being more rigid, avoid oscillations of the blades in the axial direction and thus a possible collision of these against the tower.

Another preferable set of alternatives is provided when the first and second guiding means based on rails and a plurality of wheels are replaced by first and second guiding means based on the concept of slide bearings. Thus, preferably, the first guiding means comprise at least a first guiding surface, arranged circumferentially around the axis of rotation, and the second guiding means comprise at least a second guiding surface, arranged circumferentially around the axis of rotation, facing the first guiding surface, in contact with the first guiding surface and suitable for sliding on the first guiding surface when rotating around the axis of rotation, wherein the first and second guiding surfaces form a slide bearing. This solution may include several preferred improvements:

wherein the elastic fixing means are circumferentially spaced apart from each other forming a plurality of elastic fixing units, each comprising at least one of the pieces of elastomer material, so that each of the elastic fixing units is suitable to move elastically radially independently of the other elastic fixing units, it is advantageous that the elastic fixing units are carriages comprising first guiding surfaces or second guiding surfaces and are fitted with first generating means or said second generating means. In a preferred alternative the second guiding means are carriages where, preferably, the first generating means are electrical coils, and the second generating means are magnets mounted on the carriages. In another preferred alternative the first guiding means are carriages where, preferably, the first generating means are coils mounted on the carriages and the second generating means are magnets.

As in the case of wheeled guiding means, preferably the carriages have dynamic seals extending between the carriages and the rails to prevent any particles or foreign bodies from entering the air gap.

In a preferred embodiment of the invention, the fact of employing first and second guiding means based on the concept of slide bearings, as discussed in the preceding paragraphs, is combined with the fact that, additionally, the wind turbine comprises a plurality of wheels each of which defines a rolling axis, wherein the rolling axles are perpendicular to the axial direction, and wherein the wheels are fixed to the frame (in the case where the rails are the second guiding means) or are fixed to the rotor (in the case where the rails are the first guiding means). Another preferred form of realization of the invention is had in the reverse case: the first and second guiding means are based on the concept of rails and wheels and, additionally, the wind turbine comprises a plurality of slide bearings whose sliding surfaces are parallel to the axial direction, one of them being fixed to the frame and the other fixed to the rotor.

Other alternatives and preferred options compatible with any of the above are:
the air gap distance is between 4 and 20 mm.
the axis of rotation is horizontal.
that the elastomer parts are pre-compressed.
that the elastomer parts are hydraulic elastomers.
that the hub defines an internal space arranged around the axis of rotation and around the intersection of the longitudinal axes of the blades and that the electric generator, the first means of guidance and coaxial with the axis of rotation, fixed to the frame, and the second means of guidance and coaxial with the axis of rotation, fixed to the rotor and rotating around the axis of rotation together with the hub, are housed in the internal space. As will be seen in a preferred form of realization explained below, this alternative allows a wind turbine design with a substantial saving in weight. In this preferred alternative it is advantageous that, additionally, either the first guiding means are the rails and the second guiding means are the carriages where, preferably, the first generating means are coils arranged between the rails and the second generating means are magnets mounted on the carriages, or the first guiding means are the carriages and the second guiding means are the rails where, preferably, the first generating means are coils mounted on the carriages and the second generating means are magnets arranged between the rails.

BRIEF DESCRIPTION OF THE DRAWINGS

Other advantages and features of the invention are appreciated from the following description, in which, without any limiting character, some preferred embodiments of the invention are related, mentioning of the accompanying drawings. The figures show.

DETAILED DESCRIPTION OF SOME EMBODIMENTS OF THE INVENTION

Figure 1:
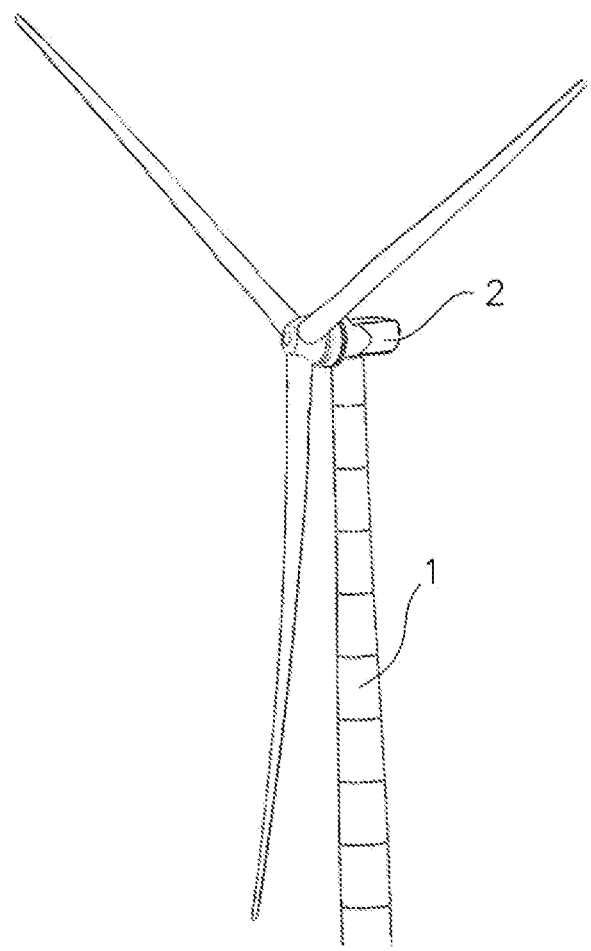
FIG. 1, a general isometric view of a direct-drive wind turbine according to the invention.
Figure 2:
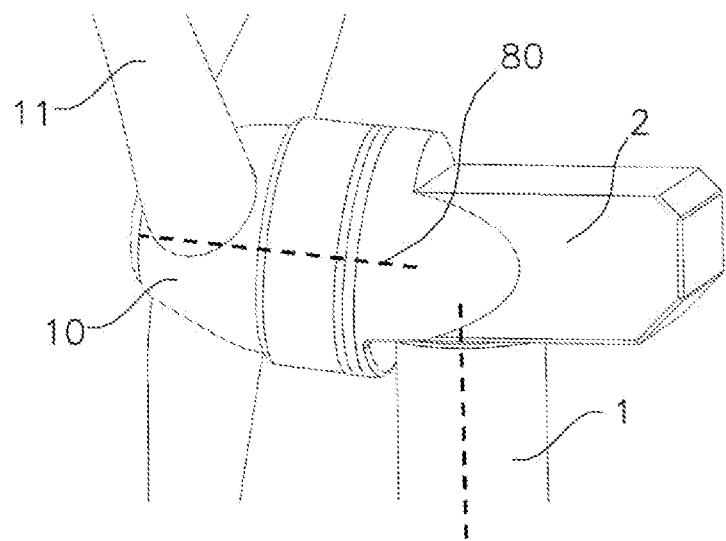
FIG. 2, a detailed isometric view of the wind turbine of FIG. 1.
Figure 3:
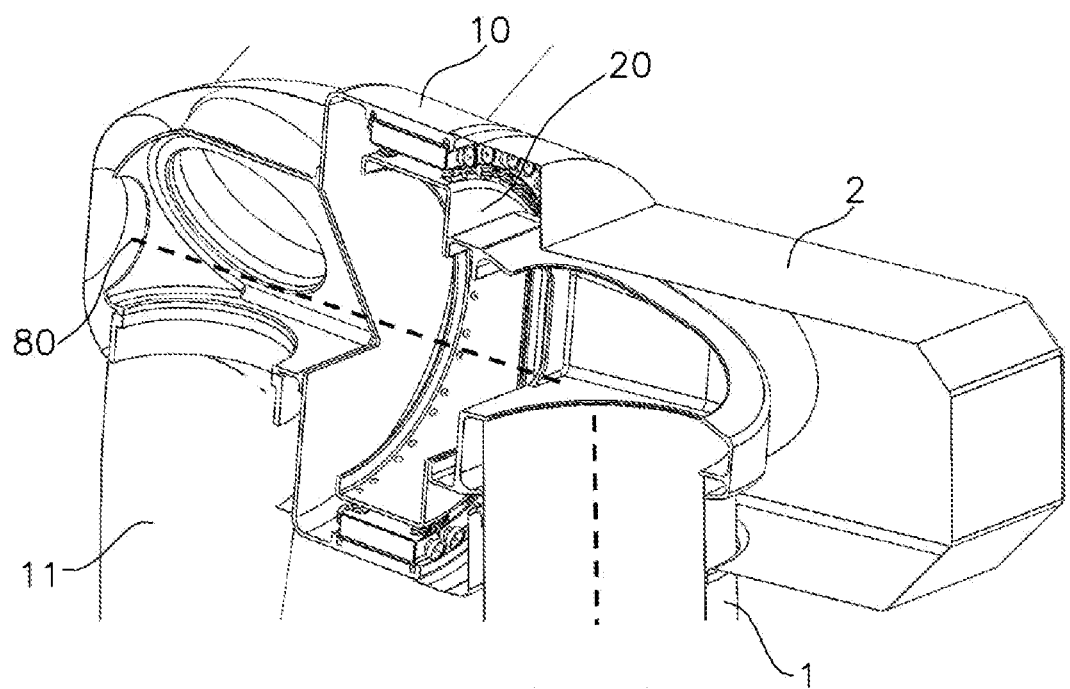
FIG. 3, an isometric view of a longitudinal section of the wind turbine of FIG. 1
Figure 4:
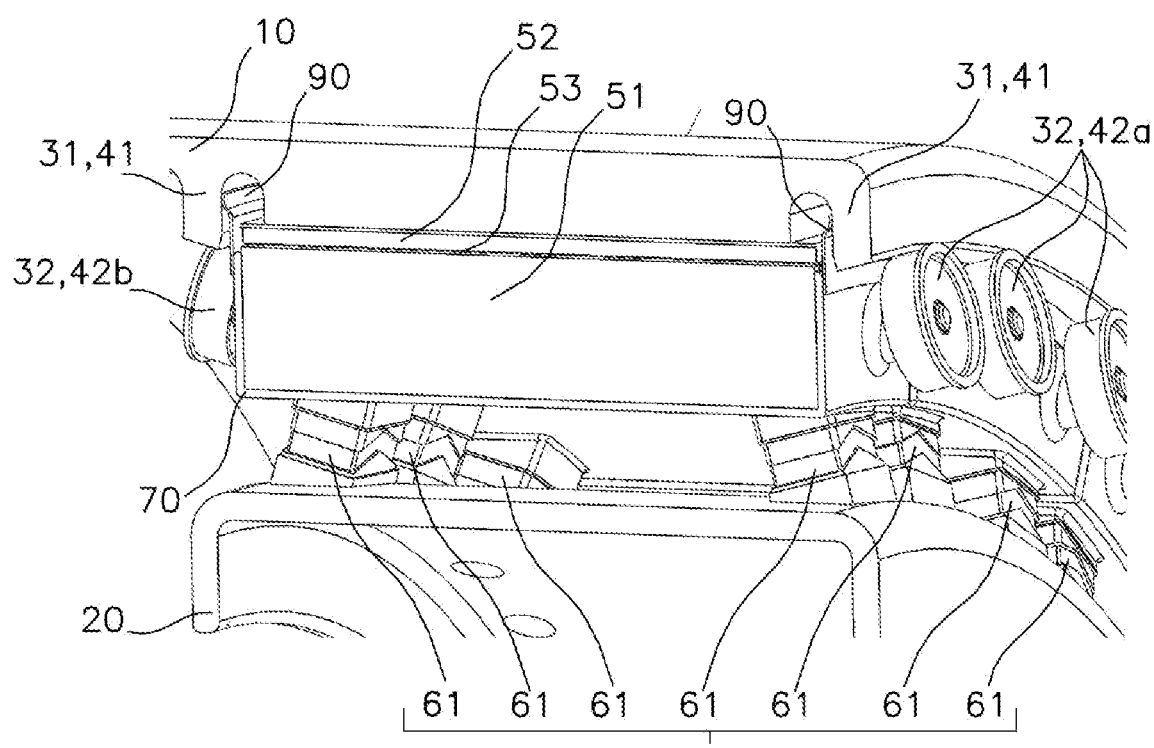
FIG. 4, a detail view of the area corresponding to the electromagnetic induction electric current generation means of the isometric view of FIG. 3.

FIGS. 1 to 10 and FIG. 26 show a first embodiment of a direct drive wind turbine according to the invention. The wind turbine comprises a tower 1 with a nacelle 2 at its upper end, and a hub 10 with blades 11 rotating about a pivot axis 80. The tower 1 defines an axis of the tower 2 and the axis of rotation 80 defines, in turn, an axial direction, a radial direction that is perpendicular to the axial direction and a circumferential direction that is tangential to the axis of rotation 80 (which would be the angular direction in a polar or cylindrical coordinate system). For its part, each blade 11 defines a longitudinal axis, which intersect each other at the axis of rotation 80.

The wind turbine includes an electric generator with a stator, fixed to a frame 20 arranged inside the nacelle 2, and a rotor which rotates solidly with the hub 10.

The stator comprises a plurality of first electromagnetic induction electric current generating means 51 which, in the present example, are electrical coils arranged circularly around the axis of rotation 80.

However, according to the preferred embodiment shown in FIGS. 1 to 10, each carriage 70 includes four wheels 42, corresponding to two first wheels 42a on one side, and rolling on a first rail, and two second wheels 42b on another symmetrical side, rolling on a second rail symmetrical to the first rail.

The magnets are arranged between the two symmetrical rails 41 such that they face the coils of the carriages 70.

In this example, the elastic fixing means 60 are formed by a plurality of elastic fixing units 61, each of which including piece of elastomeric material.

Each elastic fixing unit is substantially a rectangular parallelepiped compressed in the direction of a principal working axis 82, which in this example is inclined with respect to the radial direction, although it is also contemplated to be parallel to said radial direction.

Each elastic attachment unit will include a working surface perpendicular to and centered with respect to the main working axis 82.

Each of the elastic fixing units 61 is attached to the frame 20, on the one hand, and to the carriage 70, on the other hand, so that the main working surface is oriented towards the carriage 70. In this way each elastic fixing unit 60 exerts a force which tends to move the carriage 70 in a radial outward direction. This force therefore tends to compress the wheels 42 against the rails 41, thus ensuring a permanent contact between the two. In this way, the distance between the second generating means 52 fixed on the carriages 70 and the first generating means 51 remains substantially independent of the support of said carriages. In particular, dimensional deviations of the support of the carriages (due to manufacturing tolerances and/or deformations due to stresses) will not affect the air gap 53, which is substantially determined solely by the dimensions, tolerances and eventual deformations of the carriages 70, the wheels 42 and the rails 41. The presence of these elastic fastening means 60 makes it possible to elastically modify the distance in radial direction between the pivot axis 80 and the coils, so that this distance can vary with respect to its nominal value without influencing the air gap distance 53.

In the junction area between the nacelle 2 and the tower 1 there is an orientation system 3 that allows the orientation of the nacelle 2 towards the wind.

Figure 5:
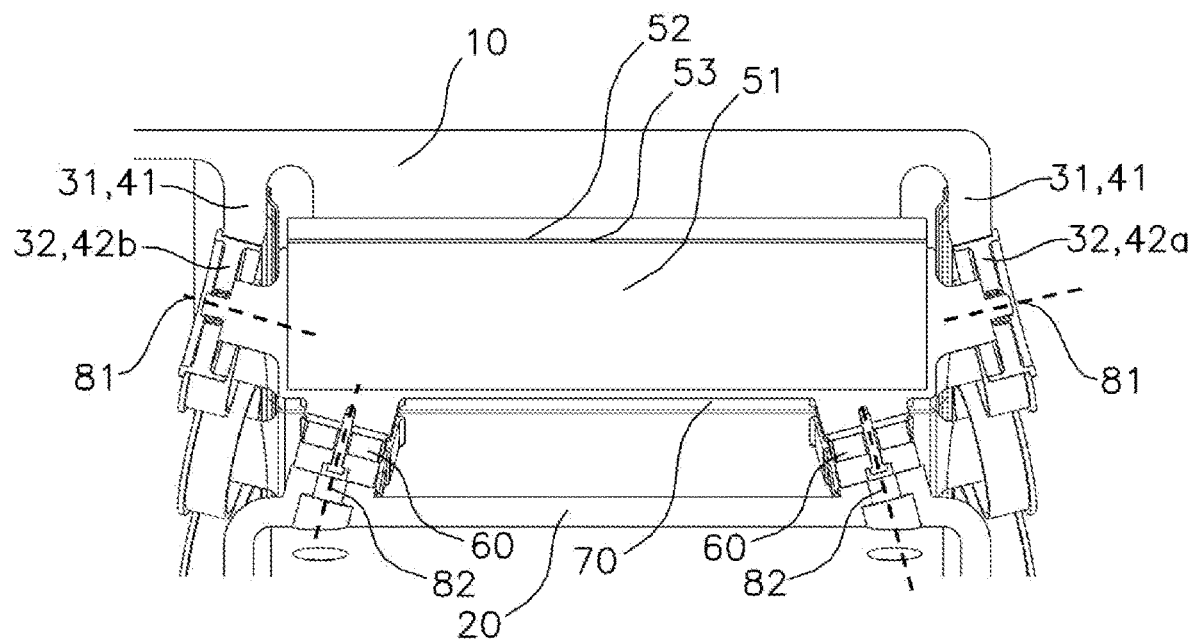
FIG. 5, a detail view of a longitudinal section of the area corresponding to the electromagnetic induction electric current generation means of the wind turbine of FIG. 1.
Figure 6:
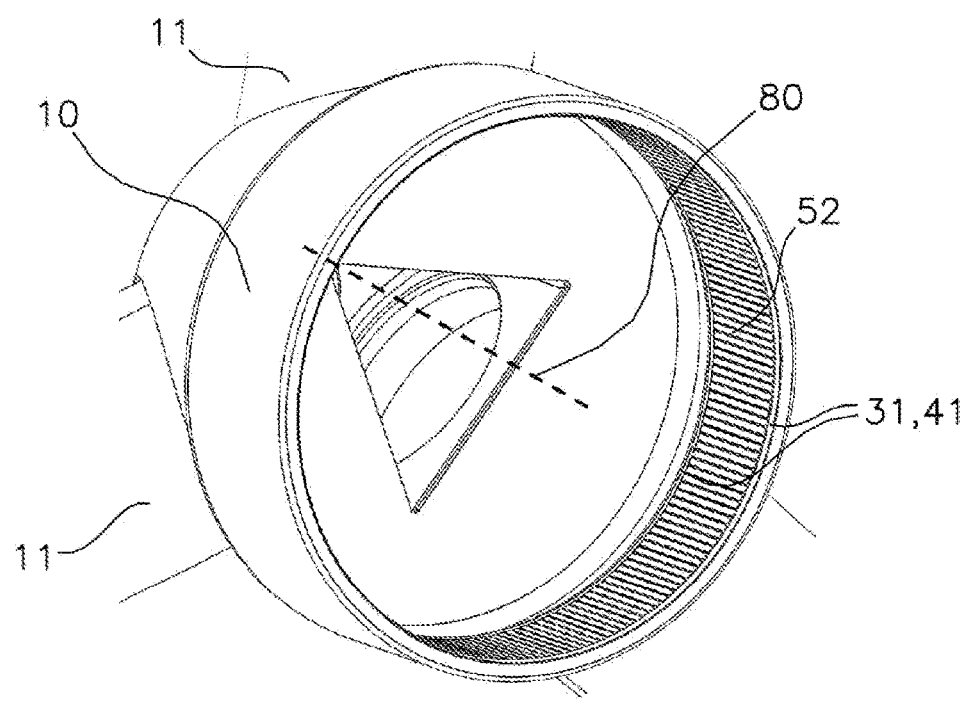
FIG. 6, an isometric view of the elements rotating in conjunction with the hub in the wind turbine of FIG. 1.
Figure 7:
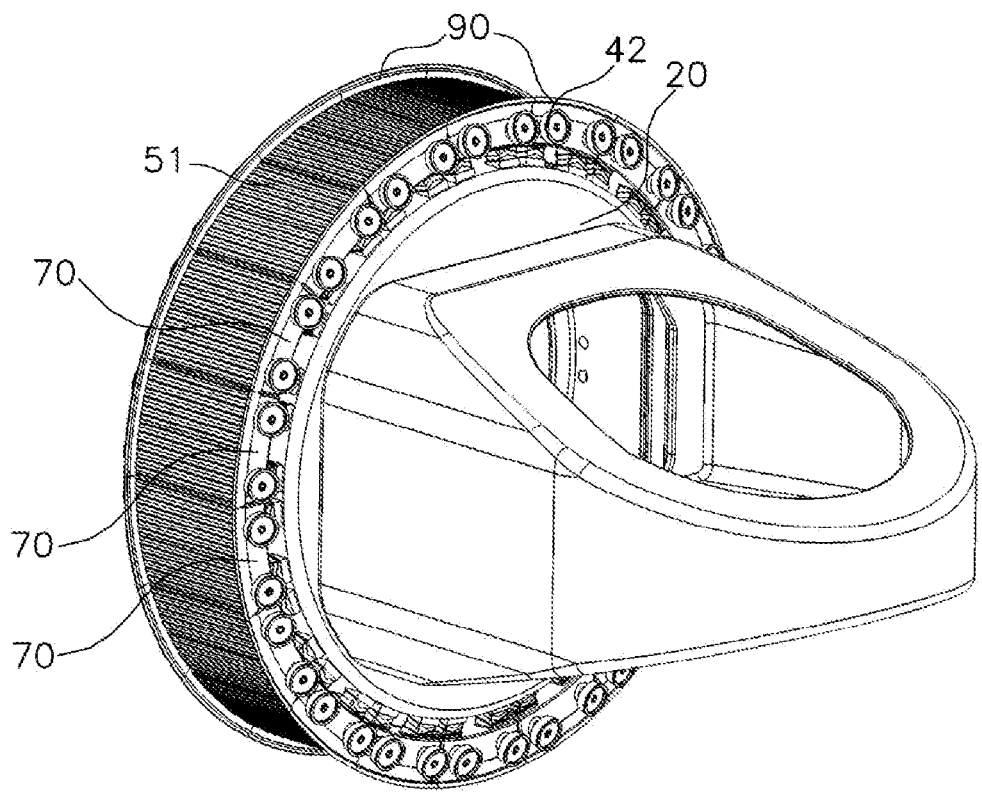
FIG. 7, an isometric view of the frame and the elements attached to it in the wind turbine of FIG. 1.
Figure 8:
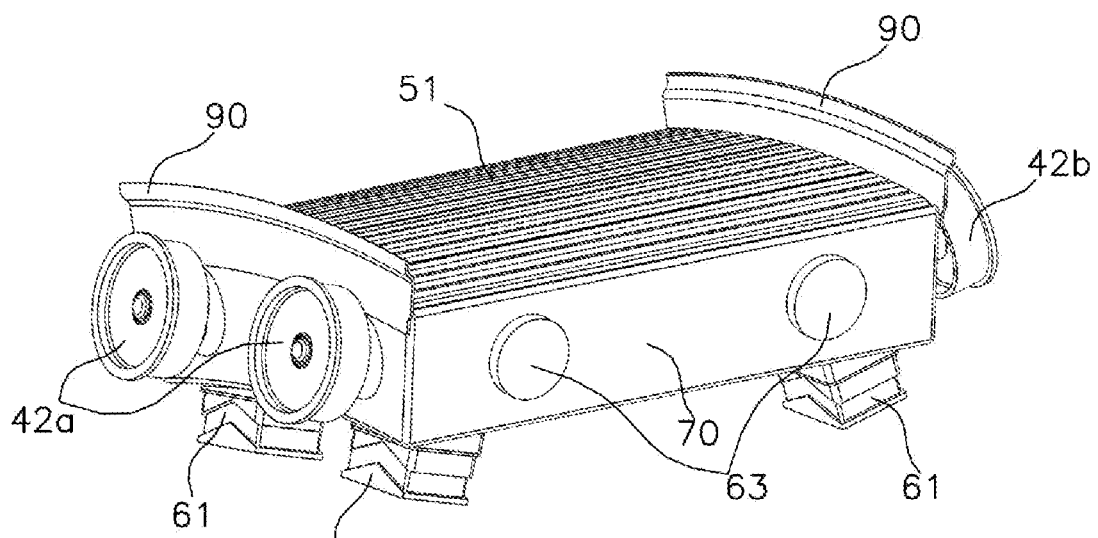
FIG. 8, an isometric view of a carriage in accordance with the invention.
Figure 9:
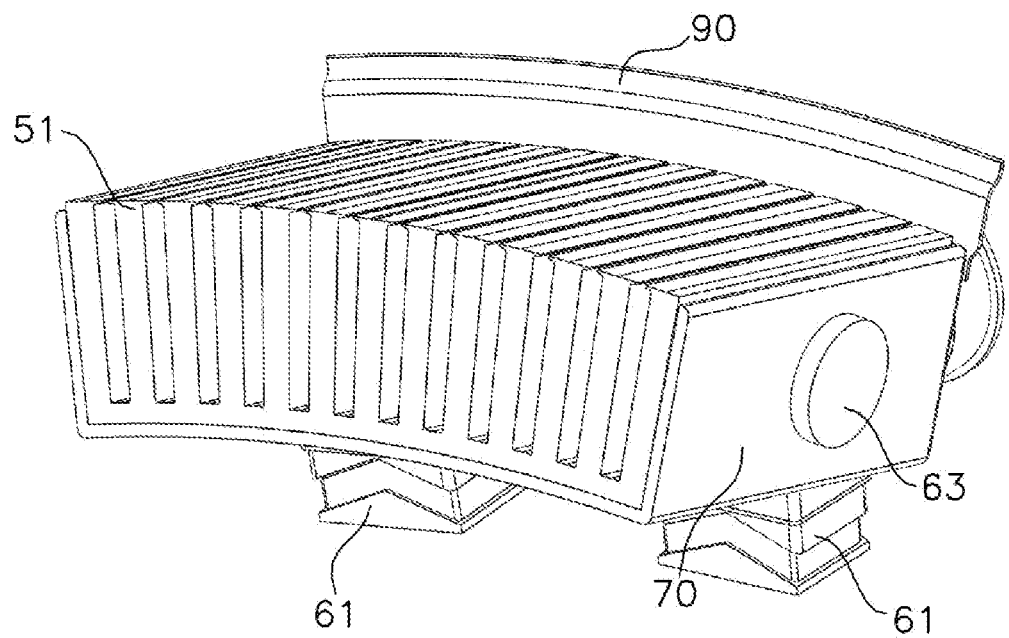
FIG. 9, a cross section of the carriage of FIG. 8.
Figure 10:
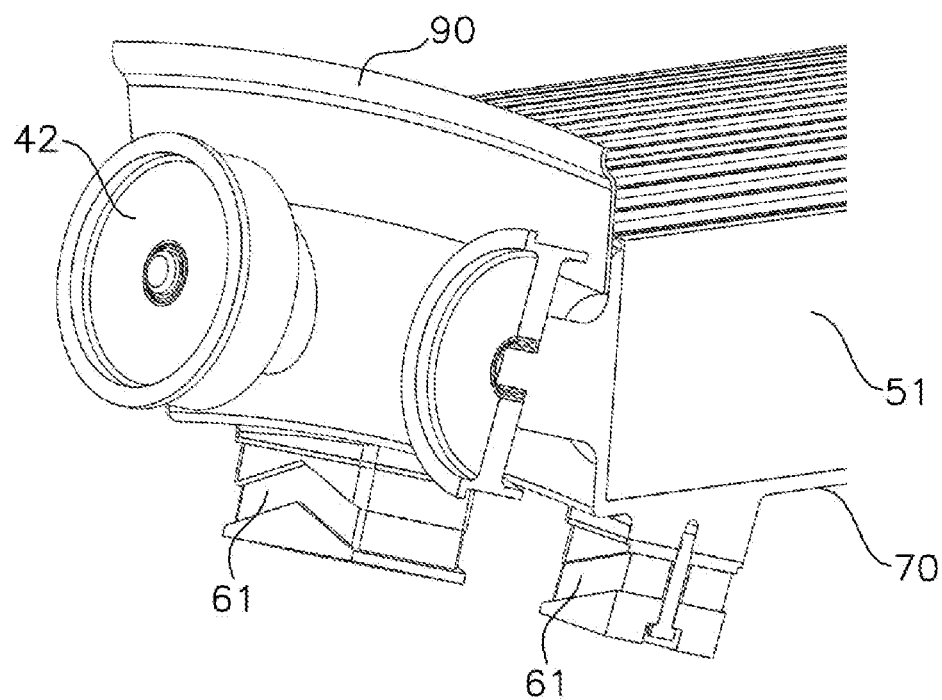
FIG. 10, a longitudinal section of the carriage of FIG. 8.

In FIG. 5 can be seen the embodiment in which the elastic fixing units 61 are inclined, with the main working axis 82 forming a non-zero angle with a plane formed by a radial direction passing through the center of the main working surface (which, in FIG. 5 would be a vertical line contained in the paper) and its corresponding tangential direction (which, in FIG. 5 would be a line exiting perpendicularly from the paper). Also, the elastic fixing units 61 are inclined with respect to a plane formed by a radial direction passing through the center of the main working surface and the axial direction (see FIG. 26).

The elastic fixing units 61 comprise pre-stressing tools, so that the pieces of elastomer material are pre-compressed. This ensures that the elastomer material parts exert the required compression force even in cases where tolerances and deformations tend to separate the wheels 42 from the rails 41 (see FIGS. 11 and 12).

According to one embodiment, shown in FIGS. 1 to 10, each rail is provided with a running or sliding surface whose cross-section is inclined with respect to the axial direction, providing a running or sliding surface with a general truncated conical geometry. As the two rails are symmetrical, both running or sliding surfaces with convergent or divergent and provide a centering of the second guiding means in the axial direction.

In this embodiment, at least some of the wheels 42 may be first wheels 42a rolling on the first rail 41 and whose rolling axis 81 is inclined with respect to the axial direction, and some of the wheels 42 may be second wheels 42b rolling on the second rail 41 and whose rolling axis 81 is inclined with respect to the axial direction, symmetrically to the first wheels, the first and second wheels providing a centering in the axial direction.

According to another embodiment, shown in FIGS. 13 to 20, the rails 41 are provided with a running or sliding surface whose cross-section is parallel to the axial direction, and on which roll the wheels 42 of the second guiding means 32 whose running axis 81 is parallel to the axial direction. In this case the centering in the axial direction is obtained by means of third guiding means 33 and fourth guiding means 34.

The third guiding means 33 and the fourth guiding means 34, are fixed one to the frame 20 and the other to the hub 10, the third guiding means 33 and the fourth guiding means 34 being parallel, coaxial with the axis of rotation 80, and complementary for a centering in the axial direction of the hub 10 with respect to the frame 20. Thus, the third guiding means 33 may be attached to the frame 20, in which case the fourth guiding means 34 will be attached to the hub 10, or conversely the third guiding means 33 may be attached to the hub 10, in which case the fourth guiding means 34 will be attached to the frame 20.

The third guiding means 33 may be rails 41 and the fourth guiding means 34 may be a plurality of wheels 42 or skids which run or slide on said rails 41. Typically said wheels will rotate about a rolling axis parallel to the radial direction.

According to another embodiment of the invention, the carriages 70 comprise dynamic seals 90 which isolate the air gap space from the outside, preventing the entry of foreign particles, dust (in particular, metallic dust), etc. Said dynamic seals 90 consist of platens or brushes fixed to the carriages 70 and with one end in contact with a complementary annular surface, a contact zone of said platens or brushes sliding on the annular surface during the rotation of the rotor with respect to the stator, preferably exerting a certain pressure, thus guaranteeing a sealing of the air gap against dust and particles.

Figure 11:
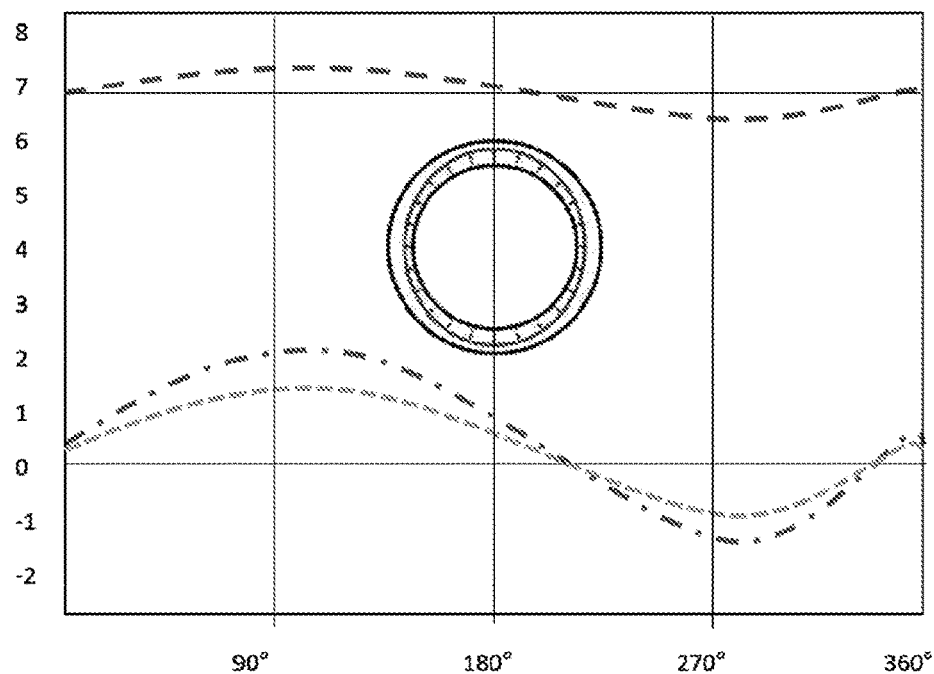
FIG. 11, a graph showing a complete revolution of the generator on the abscissa axis in degrees and distances in mm on the ordinate axis.

FIG. 11 is a graph showing a situation of extreme deformation of the part of the generator connected to the hub 10. The abscissa axis shows a complete revolution of the generator in degrees and the ordinate axis shows displacements in mm. The upper curve of the graph shows the variation of the actual air gap distance over one revolution, the air gap distance fluctuating slightly above and below the nominal air gap distance of 7 mm. The lower curves of the graph show the variation of the rotor and stator position with respect to their theoretical position, in the radial direction, over one revolution, with respect to a reference position of value 0. The difference between the two rotor and stator position curves corresponds to the variation of the air gap 53, which is minimized by the use of the elastic fixing means 60.

Figure 12:
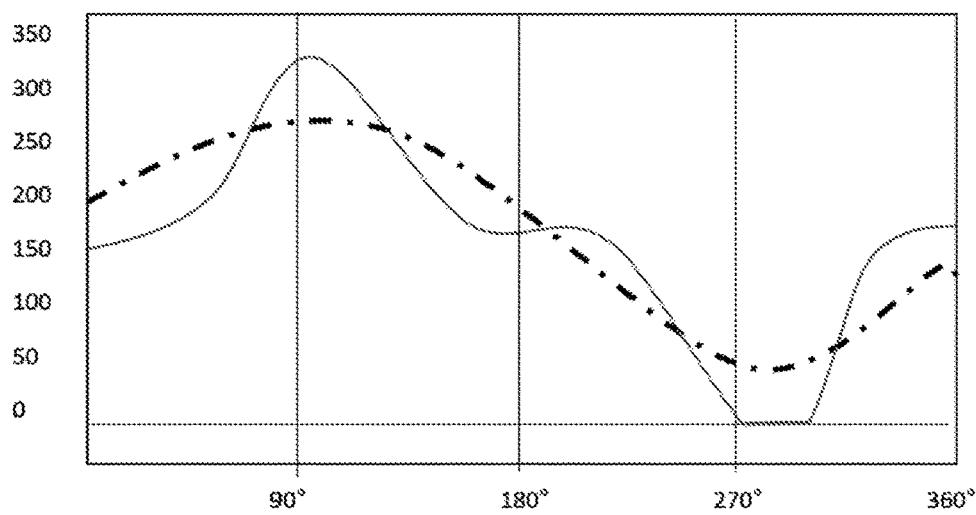
FIG. 12, a graph showing a complete revolution of the generator in degrees on the abscissa axis and forces in kN on the coordinate axis.
Figure 13:
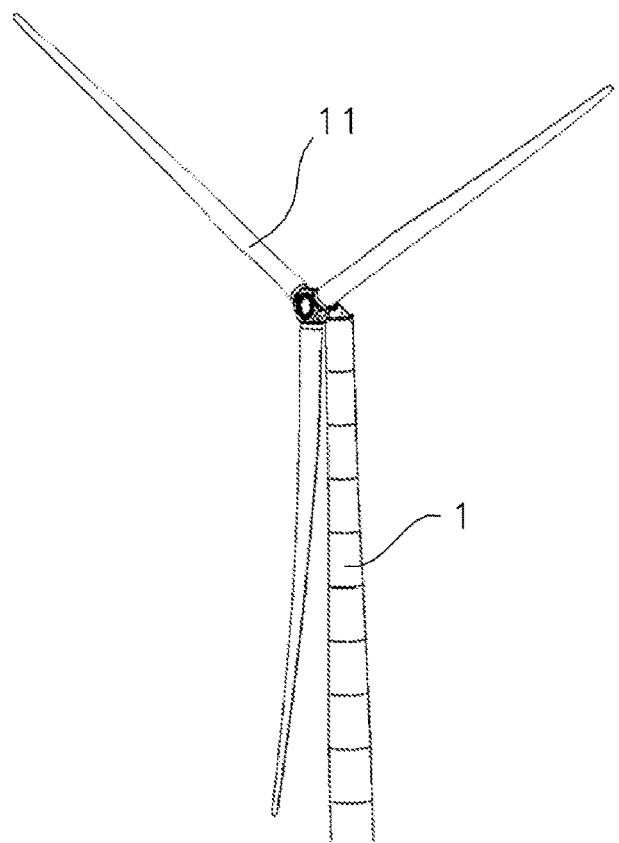
FIG. 13, a general isometric view of a second embodiment of a direct-drive wind turbine in accordance with the invention.
Figure 14:
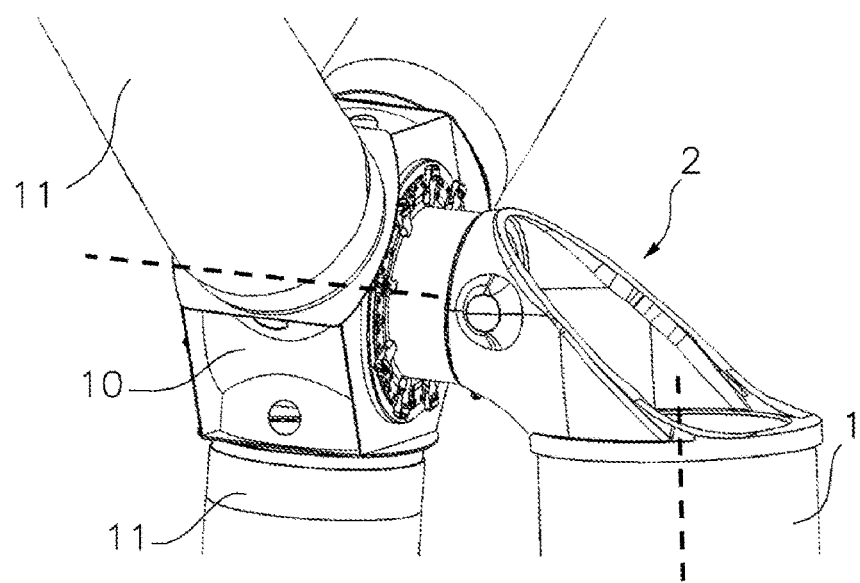
FIG. 14, a detailed isometric view of the junction area between the hub and the frame of the wind turbine of FIG. 13.
Figure 15:
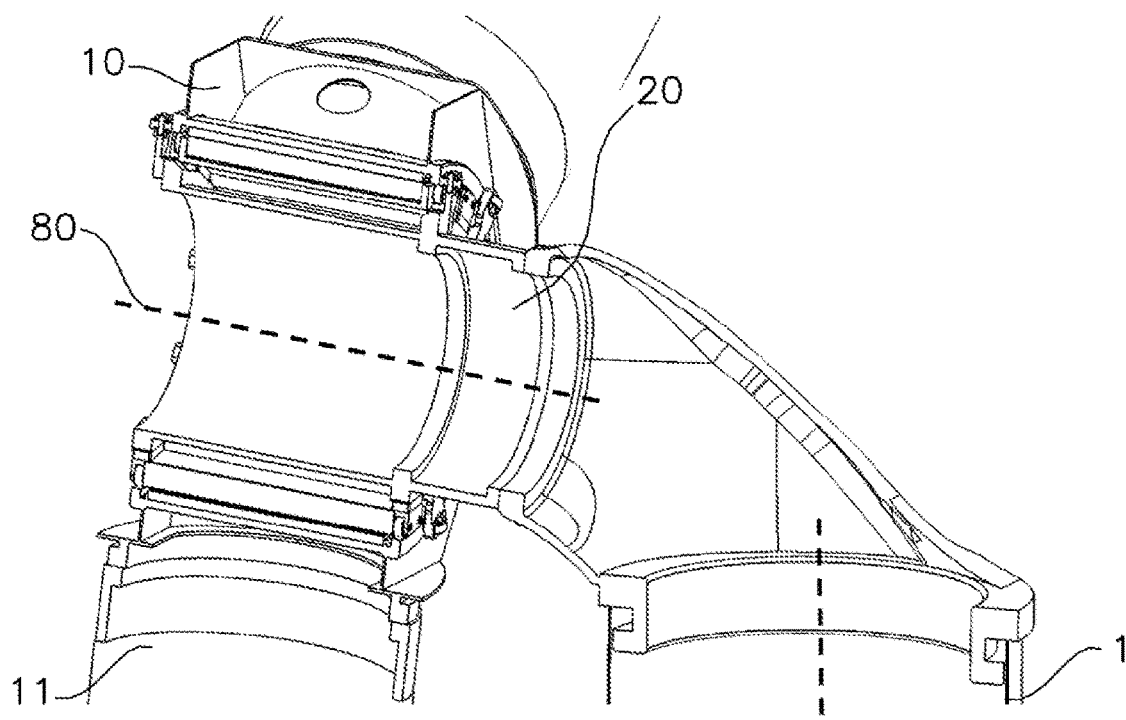
FIG. 15, an isometric view of a longitudinal section of the junction area of FIG. 14.
Figure 16:
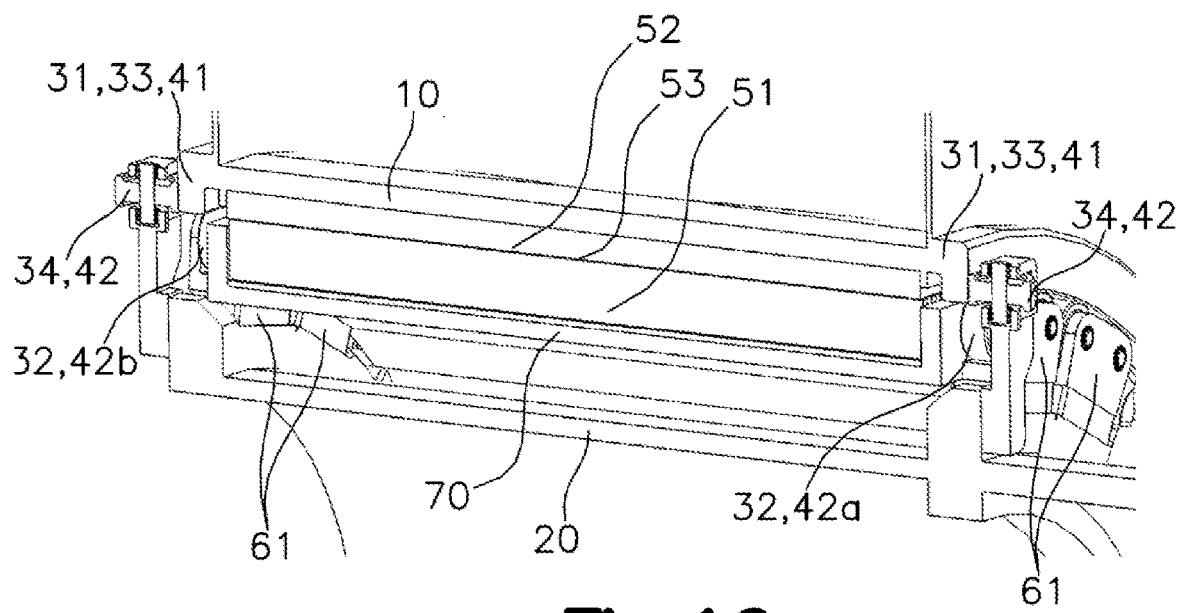
FIG. 16, a detail view of the area corresponding to the electromagnetic induction electric current generating means of the isometric view of FIG. 15.
Figure 17:
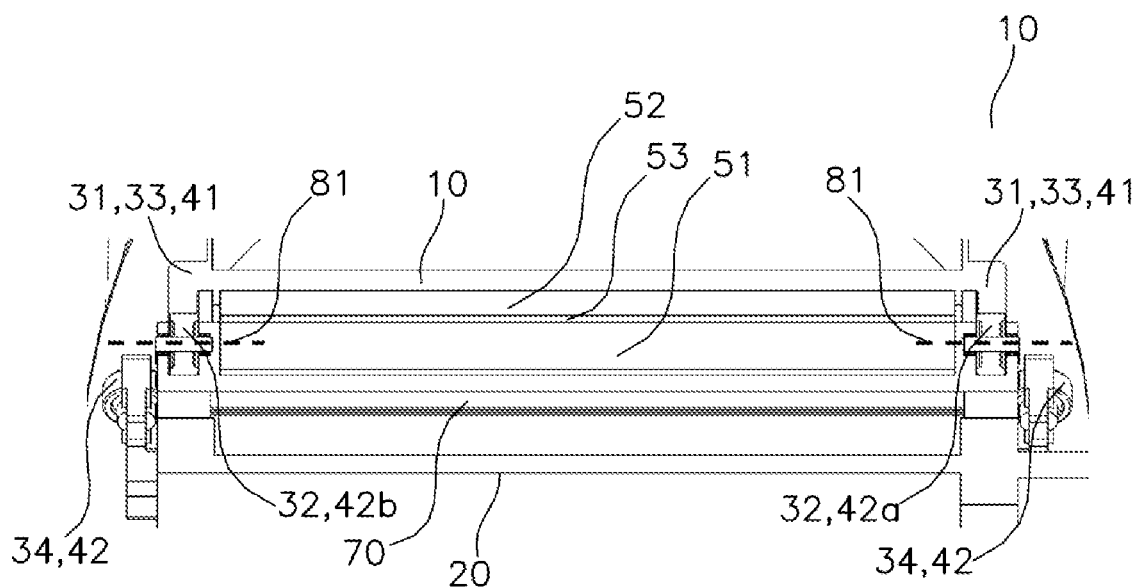
FIG. 17, a detail view of a longitudinal section of the area corresponding to the electromagnetic induction current generating means of the wind turbine of FIG. 13.
Figure 18:
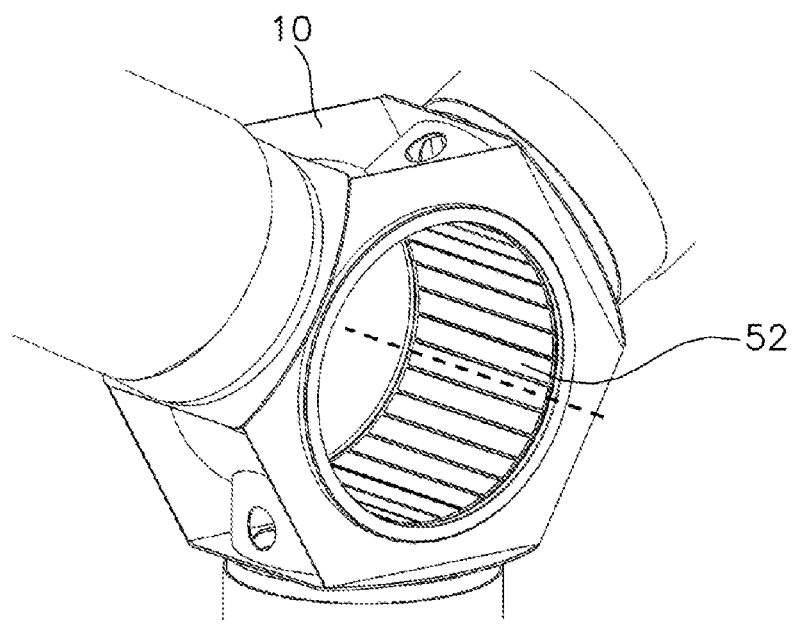
FIG. 18, an isometric view of the elements rotating together with the hub in the wind turbine of FIG. 13.
Figure 19:
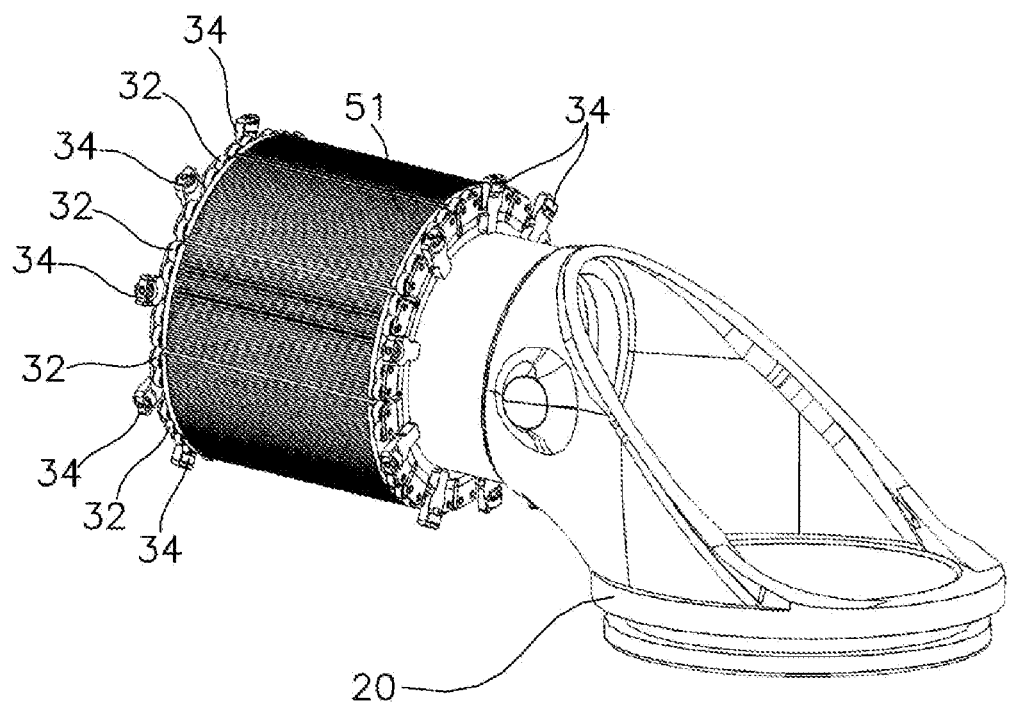
FIG. 19, an isometric view of the frame and the elements attached to it in the wind turbine of FIG. 13.
Figure 20:
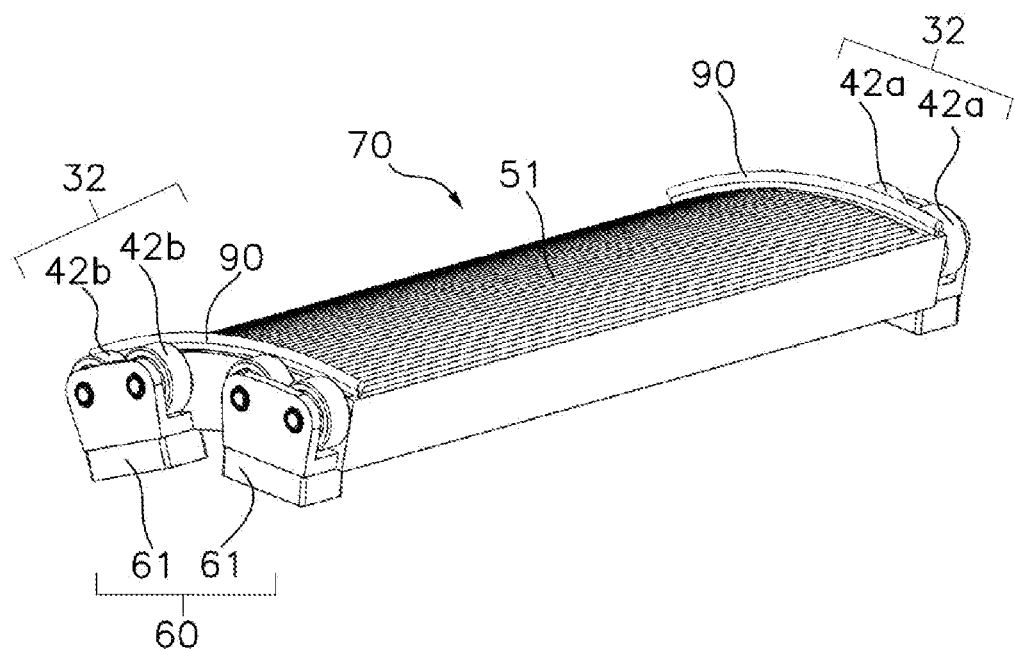
FIG. 20, an isometric view of another embodiment of a trolley in accordance with the invention.
Figure 21:
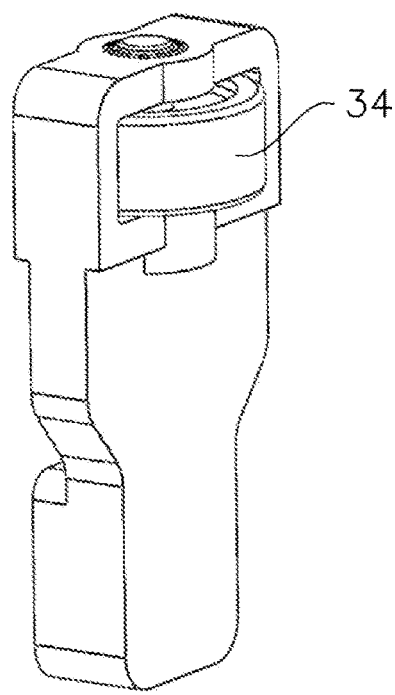
FIG. 21, an isometric view of a wheel with its rolling axis perpendicular to the axial direction of the wind turbine and its corresponding support.
Figure 22:
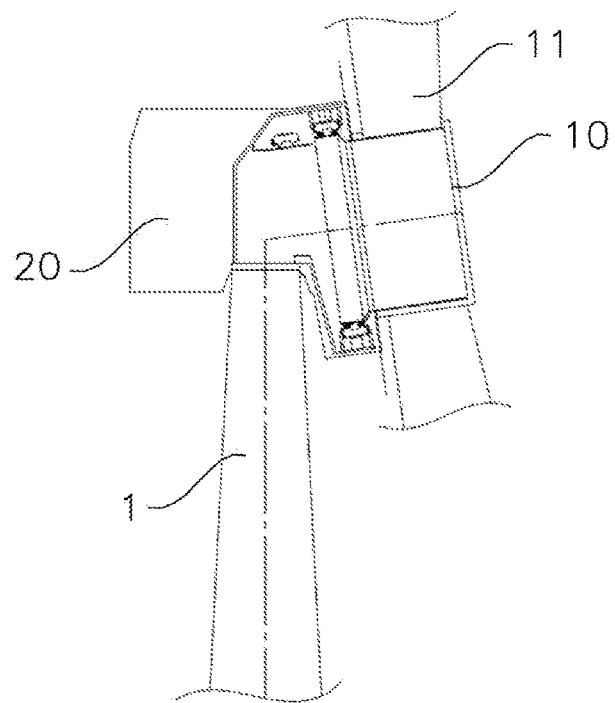
FIG. 22, a longitudinal section of the junction area between the hub and the frame of a third embodiment of a wind turbine according to the invention.
Figure 23:
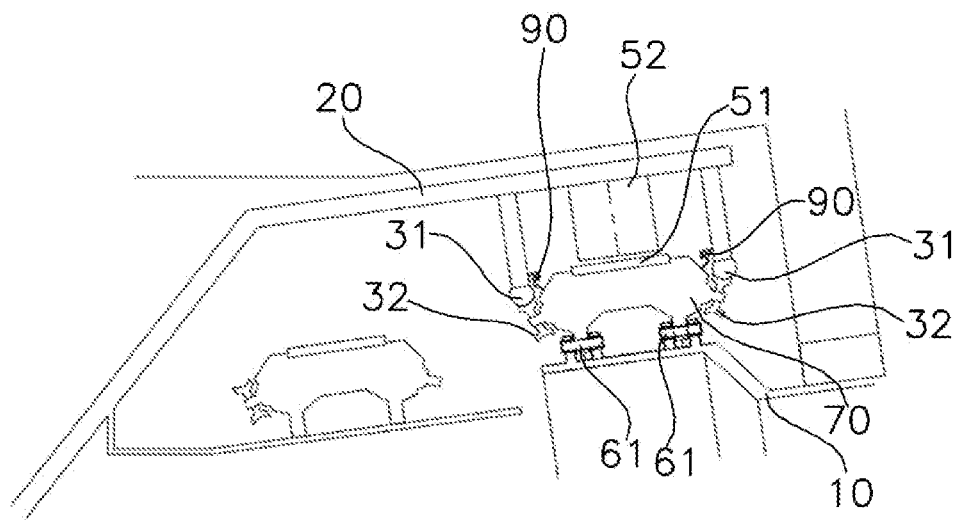
FIG. 23, a detail view of the area corresponding to the electromagnetic induction electric current generating means of the view of FIG. 22.
Figure 24:
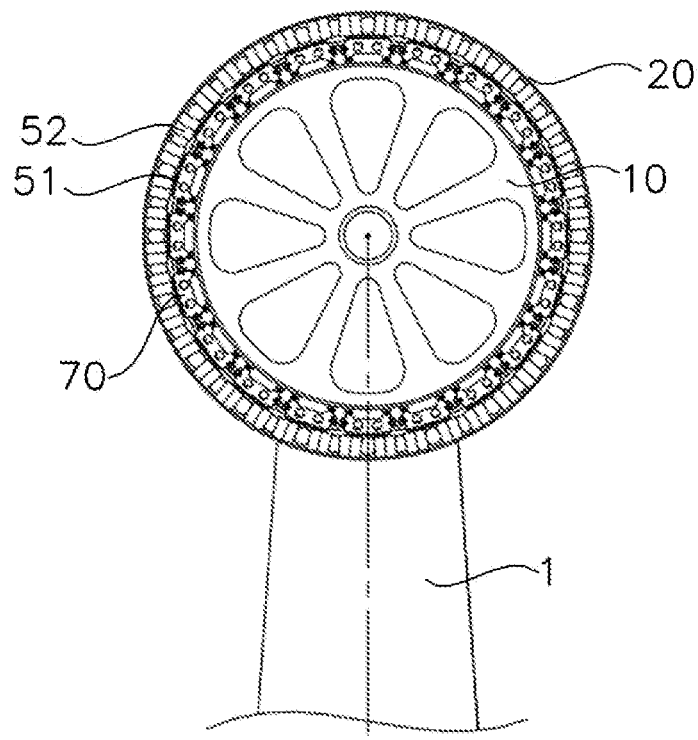
FIG. 24, a cross-sectional view according to the plane AA of FIG. 22.
Figure 25:
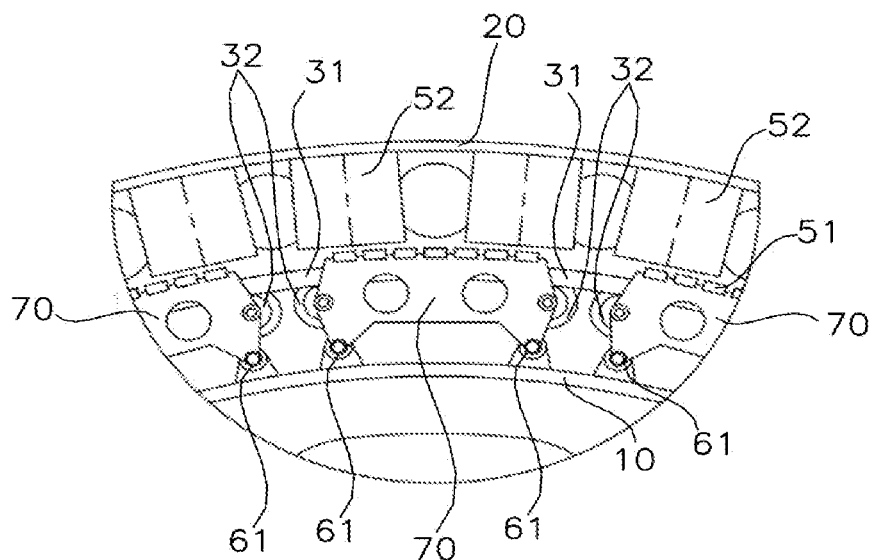
FIG. 25, a detail view of the upper end of FIG. 24.
Figure 26:
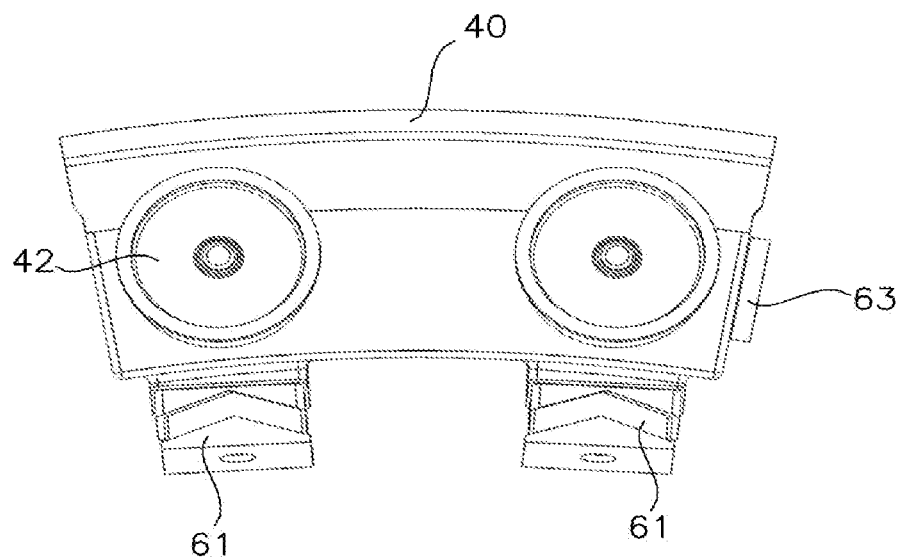
FIG. 26, a side elevation view of the carriage of FIG. 8.
Figure 27:
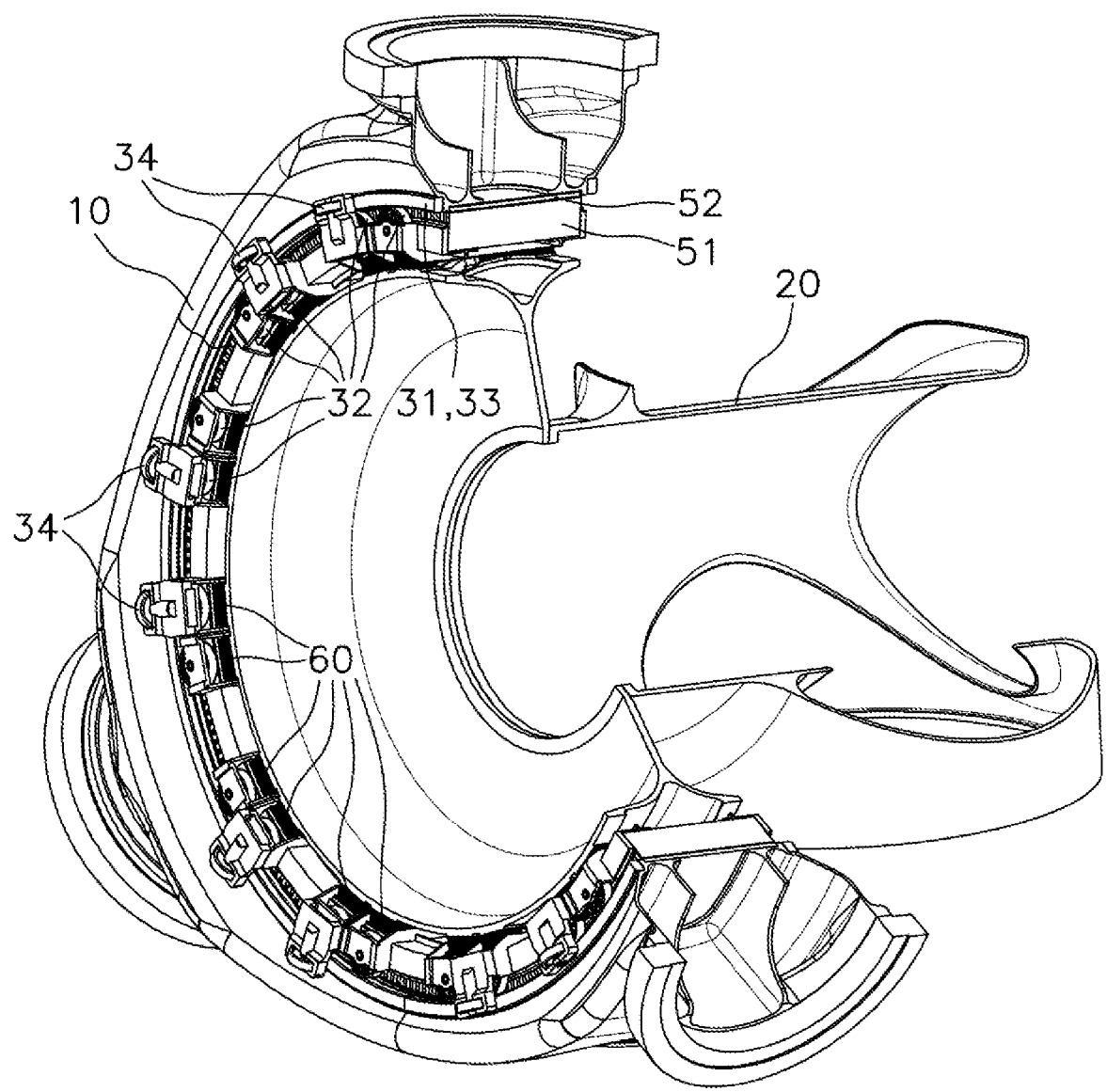
FIG. 27, an isometric view of a longitudinal section of the wind turbine according to a further embodiment.
Figure 28:
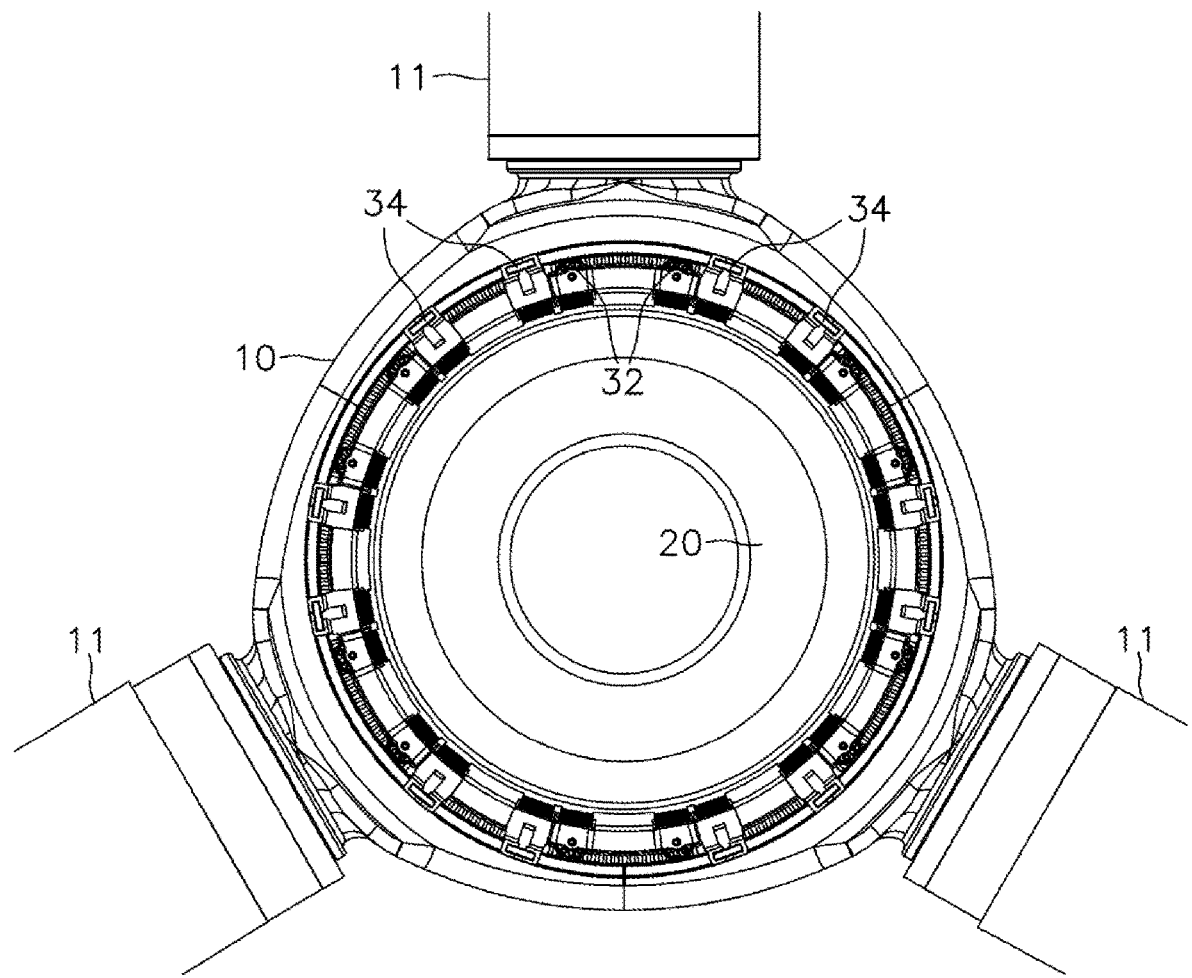
FIG. 28, a front elevation view of the wind turbine of FIG. 27

Between the two curves in the graph is shown, in exaggerated form, a schematic of the deformations experienced by the rotor in a front view of the rotor and the stator, FIG. 12 is a graph showing an extreme load situation of the wind turbine. The abscissa axis shows a complete revolution of the generator in degrees and the ordinate axis shows the trolley forces in thousands of Newtons. The more irregularly shaped curve shows the force levels at the wheels without the use of elastic fixing units 61 while the sinusoidal curve shows the force levels at the wheels 42 by incorporating prestressed elastic fixing units 61 between the trolleys 70 and the frame 20. The use of prestressed elastic fixing units 61 prevents both peak loads on the wheels 42 and the loss of the pre-tensioning force and thus the contact of the wheels 42 with the rails 41, as can be seen to occur in the irregular curve when it reaches the value 0.

In FIGS. 13 to 21 is shown another embodiment of a wind turbine according to the invention. This wind turbine comprises a plurality of elements common with that of FIGS. 1 to 10, which have been referenced with the same numerals. The most significant differences between this embodiment and the previous one are the following:

in this embodiment the hub 10 defines an internal space 30 arranged around the axis of rotation 80 in the area where the longitudinal axes of the blades 11 intersect. In this internal space 30 are housed the main elements of the electrical generator (of the stator and rotor), in particular the first electrical generating means 51 (the coils) and the second electrical generating means 52 (the magnets). Also housed in the interior space are the first guiding means 31 (the carriages 70), the second guiding means 32 (the rails 41) and the elastic fastening means 60. This results in a wind turbine with a much more compact design, with consequent savings in weight and cost.

The wheels 42 of the carriages 70 have their running axle 81 parallel to the axial direction. Additionally, there may be a second group of wheels 42, corresponding to the fourth guiding means 34, which are attached directly to the stator by means of a bracket 32 and which have their rolling axis 81 perpendicular to the axial direction. The wheels 42 of this second group can be adjusted radially independently and in a particularly rigid manner, thus preventing rotor turns in the plane perpendicular to the rotating shaft 80 and displacements in the direction of the rotating shaft 80.

In FIGS. 22 to 25 another embodiment of a wind turbine according to the invention is shown. This wind turbine also comprises a plurality of elements common with the embodiment shown in FIGS. 1 to 10, which have been referenced with the same numerals. The most significant differences between this embodiment and that of FIGS. 1 to 10 are that in this case the frame, and the remaining elements supported on the frame 20 and constituting the stator, surround the hub 10 and the other elements attached to the hub 10 and constituting the rotor, the rotor being therefore housed inside the stator, contrary to the previous embodiment in which it is the stator which is housed inside the rotor.

Another significant difference of the present embodiment is that on the frame 20 are mounted the rails 41 (which are therefore static), whereas the carriages 70 are fixed to the hub 10 and rotate in solidarity with the same. The connection between the carriages 70 and the hub 10 is made through the elastic fixing units 61.

The invention claimed is:

1. A direct drive wind turbine comprising a tower with a nacelle at an upper end of the tower, a stationary frame attached to the nacelle and a hub with blades, concentric with the frame, rotative rotating about an axis of rotation in regards the frame, the axis of rotation defining an axial direction, the wind turbine further comprising:

a succession of carriages with wheels attached thereto, each carriage of the succession of carriages being separated from the frame and fixed thereto, around the axial direction at a fixed angular position, through pre-compressed elastic fixing elements disposed circumferentially around the axis of rotation, urging each carriage of the succession of carriages in a radial direction perpendicular to the axial direction, elastically modifying the distance between the wheels and the frame in the radial direction under directionally stable gravity-induced loads during the rotation of the hub due to the fixed angular position of each carriage in regards the frame;

rails attached to the hub, coaxial with the axis of rotation, complementary to the wheels, the rails rolling about the axis of rotation supported on the wheels, the pre-compressed elastic fixing elements ensuring a permanent contact between the wheels of the carriages and the rails of the hub;

a plurality of electrical coils circularly disposed around the axis of rotation configuring a stator of an electrical generator, each carriage supporting at least one of the plurality of electrical coils;

a plurality of magnets circularly disposed around the axis of rotation, attached to the hub facing the plurality of electrical coils configuring a rotor of the electrical generator, the rotor being rotatable around the axis of rotation in solidarity with the hub, the electrical generator being suitable for generating electrical energy from the rotation of the hub with respect to the frame.

2. The wind turbine according to claim 1 wherein the rails include a first rail and a second rail each being provided with a rolling surface, the plurality of magnets being placed between the first and second rails, and the wheels include first wheels rolling on the first rail, and second wheels rolling on the second rail.

3. The wind turbine according to claim 2 wherein each first wheel is rotative around a first rolling axis inclined with respect to the axial direction and each second wheel is rotative around a second rolling axis inclined with respect to the axial direction symmetrically to the first rolling axis, the first and second wheels providing a centering in the axial direction; and/or the first rail and the second rail are symmetrical rails and the rolling surface of the first rail has a cross section inclined with respect to the axial direction and the rolling surface of the second rail has a cross section inclined with respect to the axial direction symmetrically to the cross section of the rolling surface of the first rail providing a centering in the axial direction.

4. The wind turbine according to claim 1 wherein third wheels are disposed circumferentially around the axis of rotation, each third wheel being rotative around a rolling axis perpendicular to the axial direction, being fixed to the carriages or to the frame, being complementary to third rails attached to the hub, and being configured to roll on the third rails providing a centering in the axial direction.

5. The wind turbine according to claim 1 wherein skids are disposed circumferentially around the axis of rotation, each skid being fixed to the frame and being configured to slide on the rails the skids disposed circumferentially around the axis of rotation (80) and the rails are parallel, coaxial with the axis of rotation, and complementary providing a centering in the axial direction of the hub with respect to the frame.

6. The wind turbine according to claim 1 wherein the pre-compressed elastic fixing elements are a plurality of pre-compressed elastic units independent to each other.

7. The wind turbine according to claim 6 wherein each pre-compressed elastic units of the plurality of pre-compressed elastic units produces an urging force in a main working direction forming a non-zero angle with respect to the radial direction, providing a centering in the axial direction.

8. The wind turbine according to claim 1 wherein the wheels are fixed on all carriages, or only on some carriages, or only on alternate carriages.

9. The wind turbine according to claim 1 wherein different carriages of the succession of carriages include different number of wheels.

10. The wind turbine according to claim 1, wherein between the electrical coils and the magnets an air gap distance comprised between 4 mm and 20 mm is defined.

11. The wind turbine according to claim 10 wherein the air gap is confined between dynamic seals, the dynamic seals producing a seal preventing the entry of foreign particles.

12. The wind turbine according to claim 1 wherein between the carriages of the succession of carriages are disposed pre-compressed elastomeric parts configured to generate an expansion force in the succession of carriages.

13. The wind turbine according to claim 1, wherein the pre-compressed elastic fixing elements are a plurality of elastomers.

14. The wind turbine according to claim 1 wherein the elastic fixing elements are hydraulic elastomers pre-compressed by internal hydraulic pressure.

15. The wind turbine according to claim 1 wherein the axis of rotation is a landscape axis or a horizontal axis.

16. The wind turbine according to claim 1 wherein the electrical generator is housed in an internal space defined between the hub and the frame, the internal space being surrounded by the hub and surrounding the axis of rotation and the intersection of the longitudinal axes of the blades, being at least the electric generator housed in the internal space.

17. The wind turbine according to claim 16 wherein the internal space also houses the rails, and the wheels.

18. The wind turbine according to claim 1 wherein the rotor surrounds the stator.

19. The wind turbine according to claim 1 wherein the stator surrounds the rotor.

* * * * *